US 7,330,444 B1

(12) United States Patent
Pasqua (10) Patent No.: US 7,330,444 B1
(45) Date of Patent: Feb. 12, 2008

(54) CLUSTER COMMUNICATION IN HEARTBEAT MESSAGES

(75) Inventor: Joseph Pasqua, Menlo Park, CA (US)

(73) Assignee: Symantec Operating Corporation, Cupertino, CA (US)

( * ) Notice: Subject to any disclaimer, the term of this patent is extended or adjusted under 35 U.S.C. 154(b) by 1036 days.

(21) Appl. No.: 10/624,048

(22) Filed: Jul. 21, 2003

(51) Int. Cl.
*H04B 1/44* (2006.01)
*H04L 5/22* (2006.01)
*H04J 3/24* (2006.01)

(52) U.S. Cl. .................... 370/282; 370/300; 370/474
(58) Field of Classification Search ............. 370/236, 370/252, 253, 282, 300, 395.1, 470–476
See application file for complete search history.

(56) References Cited

U.S. PATENT DOCUMENTS

| | | | |
|---|---|---|---|
| 5,898,669 A * | 4/1999 | Shimony et al. | 370/232 |
| 6,226,265 B1 * | 5/2001 | Nakamichi et al. | 370/235 |
| 6,463,036 B2 * | 10/2002 | Nakamura et al. | 370/236.1 |
| 6,650,640 B1 * | 11/2003 | Muller et al. | 370/392 |
| 2005/0007964 A1 * | 1/2005 | Falco et al. | 370/256 |

OTHER PUBLICATIONS

"Tutorial on Reed-Solomon Coding for Fault-Tolerance in RAID-like Systems"; James S. Plank; Department of Computer Science; University of Tennessee; Feb. 19, 1999; pp. 1-19.

"A Digital Fountain Approach to Reliable Distribution of Bulk Data"; John W. Byers, Michael Luby, Michael Mitzenmacher, & Ashutosh Rege; Feb. 13, 1998; International Computer Science Institute; Berkeley, CA pp. 1-20.

"Practical Loss-Resilient Codes"; Michael Luby, Michael Mitzenmacher, Amin Shokrollahi, Daniel Spielman, & Volker Stemann; International Computer Science Institute, Berkeley, CA; May 1997; Presented at The Twenty-Ninth Annual ACM Symposium on Theory of Computing (STOC); pp. 1-19 with Abstract.

* cited by examiner

*Primary Examiner*—Wing Chan
*Assistant Examiner*—Hong Sol Cho
(74) *Attorney, Agent, or Firm*—Meyertons Hood Kivlin Kowert & Goetzel, P.C.; Rory D. Rankin (57) ABSTRACT

A method and mechanism for inter-node communication. A first node is coupled to a second node via a communication link. The first node is configured to convey a heartbeat or similar data packet to the second node on a periodic or other scheduled basis. A message manager within the first node is configured to detect an inter-node message is available for transmission to the second node. If the detected message exceeds a predetermined size, the message is partitioned into blocks which are less than or equal in size to the predetermined size. The blocks are then encoded pursuant to a forward error correcting algorithm, such as an erasure code algorithm, and stored as payload in the periodically conveyed data packets. Pseudo-header information may also be included with each block to indicate a message type, message identifier, message length, or block sequence number.

19 Claims, 7 Drawing Sheets

CLUSTER COMMUNICATION IN HEARTBEAT MESSAGES

BACKGROUND OF THE INVENTION

1. Field of the Invention

This invention is related to the field of data communications and, more particularly, to the use of forward error correcting codes in communication protocols.

2. Description of the Related Art

While individual computers enable users to accomplish computational tasks which would otherwise be impossible or impractical by the user alone, the capabilities of an individual computer can be multiplied by using it in conjunction with one or more other computers. Individual computers are therefore commonly coupled together to form a computer network.

Computers may be interconnected to form networks according to a variety of topologies. For example, several computers may each be connected to a single bus, they may be connected to adjacent computers to form a ring, or they may be connected to a central hub to form a star configuration. While a variety of network configurations have arisen, one such configuration which has become popular is the "cluster". Generally speaking, a cluster is a collection of computing resources (or "nodes") which may be treated as a single computing resource. Typically, each of the nodes within the cluster represent fully realized computing resources in and of themselves. For example, a very simple cluster may include two nodes. Each of the two nodes in this simple cluster may include their own processing and storage resources and may be fully capable of providing service to network users on its own. Consequently, if a single node in a multi-node cluster were to fail, network operations may continue. Larger network configurations may include clusters with hundreds of nodes, computing grids with thousands of nodes, or a variety of other configurations.

While coupling computing resources together may serve to increase availability or reliability, it is generally necessary or desirable for nodes within such clusters or networks to communicate with one another. However, in recent years computing applications have become increasingly data intensive. Consequently, the demands placed on networks due to the increasing amounts of data being transferred has increased dramatically and bandwidth is frequently at a premium. Therefore, inter-node communication may only serve to compete with network users and other applications for available bandwidth. Such competition may adversely impact system performance and response. Therefore, an efficient method of inter-node communication is desired.

SUMMARY OF THE INVENTION

A method and mechanism for inter-node communication are described herein. In one embodiment, nodes in a computing network or cluster are coupled to one another via a communication link. A first node in a cluster is configured to convey a heartbeat or similar data packet according to a predetermined schedule to the second node via the link. In one embodiment, the communication link comprises a heartbeat network in which packets are conveyed on a periodic basis. In addition to conveying a heartbeat from the first node to the second node, a message manager or other component within the first node is configured to detect when an inter-node message is available for transmission to the second node. If the detected message is sufficiently small, the message is inserted into one of the heartbeat packets as payload. Alternatively, if the message exceeds a predetermined size, the message is partitioned into blocks which are less than or equal in size to the predetermined size. Each of the blocks are then placed in different heartbeat packets for conveyance to the second node.

In a further embodiment, partitioned blocks are first encoded pursuant to a forward error correcting algorithm, such as an erasure code algorithm, prior to storing them in heartbeat packets. Blocks may also include pseudo-header information to aid in identifying associated blocks and reconstructing the original message. In one embodiment, the protocol used for transmission of heartbeat or similar packets is connectionless and does not guarantee delivery. In such an embodiment, the algorithm selected for encoding may be chosen such that the original message can be reconstructed even if fewer than all packets are received.

BRIEF DESCRIPTION OF THE DRAWINGS

Other objects and advantages of the invention will become apparent upon reading the following detailed description and upon reference to the accompanying drawings in which.

While the invention is susceptible to various modifications and alternative forms, specific embodiments thereof are shown by way of example in the drawings and will herein be described in detail. It should be understood, however, that the drawings and detailed description thereto are not intended to limit the invention to the particular form disclosed, but on the contrary, the intention is to cover all modifications, equivalents and alternatives falling within the spirit and scope of the present invention as defined by the appended claims.

DETAILED DESCRIPTION OF THE INVENTION

Computer networks have been widely used for many years now and assume a variety of forms. One well known form of network, the Local Area Network (LAN), typically includes a number of workstations coupled to a server via a LAN interconnect. Popular LAN topologies include Ethernet, ring, and star. These workstation-server topologies are generally referred to as client-server network model. Clients are devices connected to the network which share services or other resources. These services or resources are administered by a server. Servers are computers or software programs which provide services such as data storage, applications, or print sharing to clients. When a client requires access to data storage, the client submits a request to server via a LAN interconnect. The server then services requests for access to data storage which are received from clients. Because the server services all requests for access to storage, requests must generally be handled one at a time. One possible interconnect technology between server and storage is the traditional SCSI interface. A typical SCSI implementation may include a 40 MB/sec bandwidth, up to 15 drives per bus, connection distances of 25 meters and a storage capacity of 136 gigabytes.

As networks grow, new clients may be added, more storage may be added and servicing demands may increase. As mentioned above, all requests for access to storage may be serviced by server. Consequently, the workload on the server may increase dramatically and performance may decline. To help reduce the bandwidth limitations of the traditional client-server model, computing clusters and Storage Area Networks (SAN) have become increasingly popular in recent years. Storage Area Networks interconnect servers and storage at high speeds. By combining existing networking models, such as LANs, with computing clusters and Storage Area Networks, performance of the overall computer network may be improved.

Figure 1:
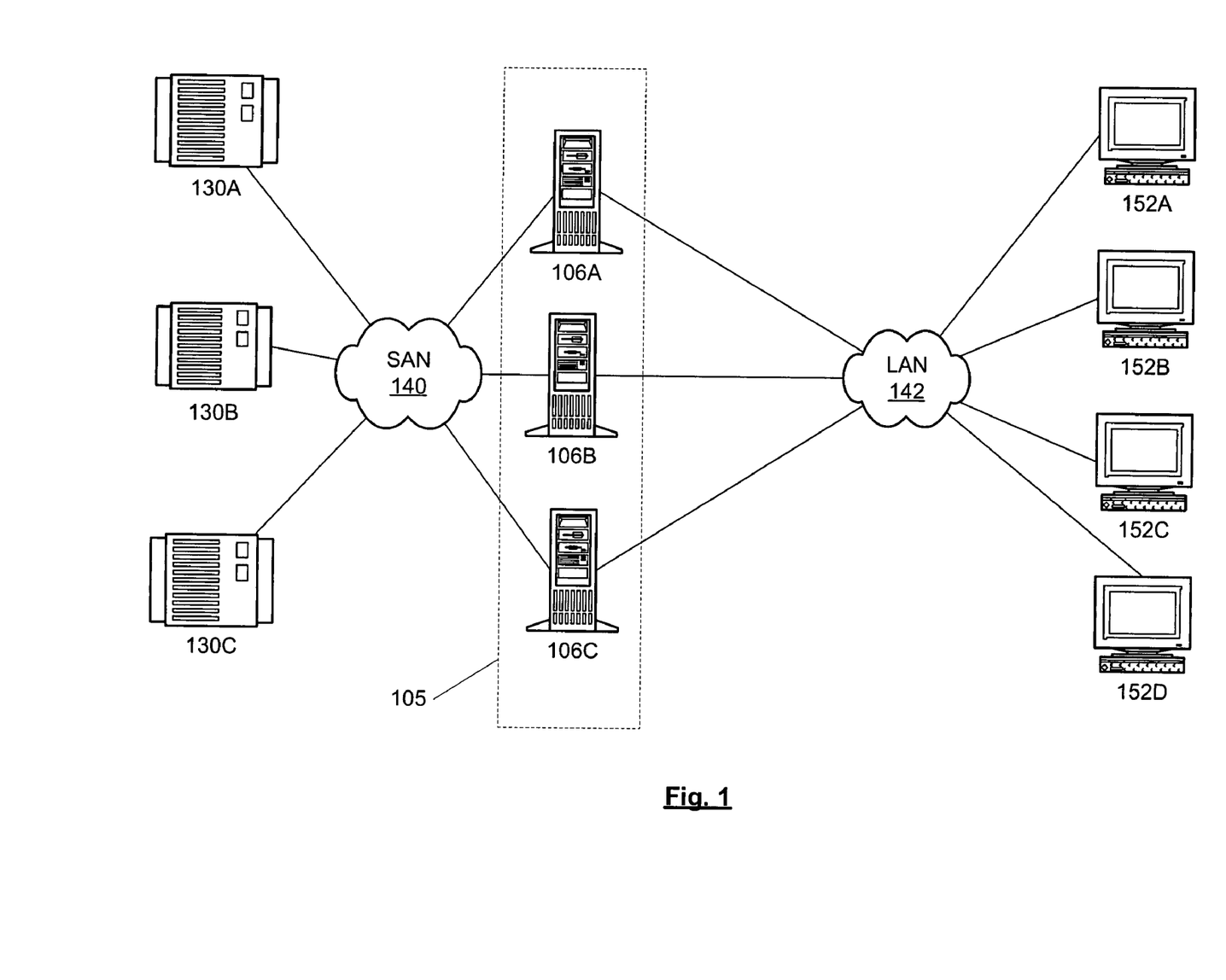
FIG. 1 illustrates one embodiment of a computer network.

FIG. 1 shows one embodiment of a computing cluster, SAN, and LAN in a computer network. In the example shown, servers 106A-106C form a cluster 105. Together with data storage devices 130A-130C and SAN interconnect 140, servers 106 form a SAN. Servers 106 have direct access to any of the storage devices 130 which are connected to the SAN interconnect 140. SAN interconnect 140 is typically a high speed interconnect, such as Fibre Channel. As already noted, the servers and storage devices comprise a network in and of themselves. In the SAN, no server is dedicated to a particular storage device as in a LAN. Any server 106 may access any storage device 130 on the storage area network. Representative characteristics of a SAN may include a 200 MB/sec bandwidth, up to 126 nodes per loop, a connection distance of 10 kilometers, and a storage capacity of 9172 gigabytes. Consequently, the performance, flexibility, and scalability of a SAN may be significantly greater than that of a typical SCSI based system.

Also included in the network of FIG. 1 are workstations 152 and LAN interconnect 142. As shown in FIG. 1, LAN 142 is coupled to cluster 105. Because each storage device 130 may be independently and directly accessed by any server 106, overall data throughput between the LAN and SAN may be much greater than that of the traditional client-server LAN. For example, if workstations 152A and 152C both submit access requests to storage 130, two of servers 106 may service these requests concurrently. Alternatively, one of servers 106 may be configured as a failover server. In the event one of the servers 106 fails, another may become active in order to prevent service interruption or downtime. As already noted, numerous such network configurations are possible and are contemplated.

Figure 2:
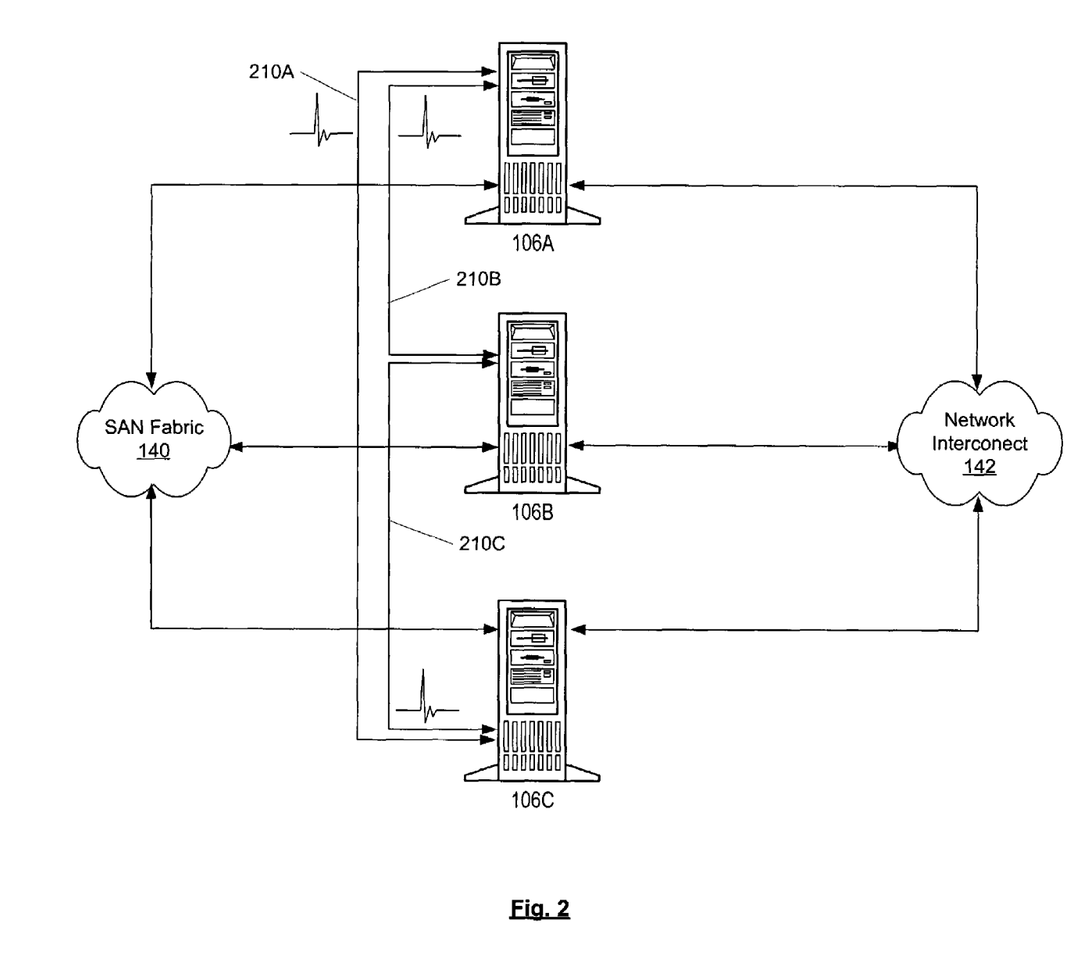
FIG. 2 illustrates one embodiment of a computing cluster.

Turning to FIG. 2, an alternative view of the network in FIG. 1 is provided. FIG. 2 illustrates that nodes 106A-106C are not only coupled to network interconnects 140 and 142, but are also coupled to one another via interconnects 210A-210C. In one embodiment, interconnects 210 comprise a "heartbeat" network and are configured to convey heartbeats between the nodes. Heartbeats are frequently utilized in such networks in order to detect that a particular node is functioning properly. Generally speaking, heartbeat messages are periodically sent between machines via a separate heartbeat network and if an expected message is not received from a particular machine then the machine is assumed to have failed and appropriate corrective action may be taken. In various embodiments, heartbeat networks may be configured to support point-to-point, multicast, or broadcast messages. For example, while FIG. 2 illustrates heartbeat network 210 as separate interconnects, other embodiments may include bus, star, or any other suitable topology.

Generally speaking, heartbeat networks are designed for very limited purposes and heartbeat packets themselves may be kept relatively simple. The receipt of a heartbeat packet from a particular source may, in and of itself, serve the purpose of indicating that the sending node is still alive. Consequently, the particular content of the heartbeat packets themselves tends to be relatively small and simple. In addition, it is common that the particular communication protocol being used for the heartbeat network may specify a minimum packet size which is larger than is necessary for the purposes of the heartbeat network. Therefore, heartbeat packets which are exchanged among nodes may be largely empty, or null.

It is noted that while the discussion herein describes heartbeats and a separate heartbeat network, alternative embodiments may convey heartbeat messages upon a common data network. For example, heartbeat messages could be conveyed between nodes 106A-106C via LAN interconnect 142. Further, the methods and mechanisms described herein may be applied to other than heartbeat communications. Generally speaking, any communication between nodes which is performed according to a predetermined schedule, periodic or otherwise, is contemplated. Those skilled in the art will appreciate that a variety of network configurations are possible and my be utilized in conjunction with the methods and mechanisms described herein.

In addition to sending and receiving heartbeat messages between nodes in a network or cluster, nodes within a cluster may also communicate other types of information amongst each other. For example, changes in cluster membership may be conveyed upon entry or exit of a node from the cluster, various types of event detection messages may be conveyed, synchronization messages may be shared, and so on. The particular types of inter-node communication which takes place will depend upon the configuration and needs of a given cluster or network.

With respect to the embodiment of FIG. 2, two options present themselves for the conveyance of inter-node messages. One option is to utilize either the SAN fabric 140 or the interconnect 142 to convey messages between nodes 106. However, as already discussed above, bandwidth resources may be limited. Therefore, it may be undesirable to configure the system in such a way that inter-node communication messages compete with other traffic for the limited resources of either the fabric 140 or the interconnect 142. A second possible option for the transmission of inter-node messages may be to utilize the heartbeat network 210. However, as the proper functioning of the heartbeat network generally entails time sensitive packet transmissions, burdening the heartbeat network with additional traffic may not be desirable. Of course, one additional option would be to add another network to the system illustrated in FIG. 2 for the sole purpose of supporting inter-node communication. However, this last option would necessitate the purchase and support of additional hardware and software to support such a network.

In order to provide inter-node communication without consuming additional bandwidth and without requiring investment in a new hardware/software infrastructure, a method and mechanism are described herein. Generally speaking, as is further discussed below, the mechanism contemplates utilizing the heartbeats themselves for the transport of inter-node communications. As will become apparent from the discussion below, communication devices other than heartbeats may serve in a similar capacity to support the method and mechanism.

As described above, heartbeat networks (and mechanisms) are typically structured as relatively simple networks which are configured to periodically convey small packets of information. For example, in one embodiment a User Datagram Protocol (UDP), or similar protocol, may be used to implement a heartbeat mechanism. UDP is typically used by applications that do not require a level of service which may be provided by protocols such as the Transmission Control Protocol (TCP). In particular, as opposed to a protocol like TCP, UDP is a connectionless protocol and provides no guarantee of delivery.

Figure 3:
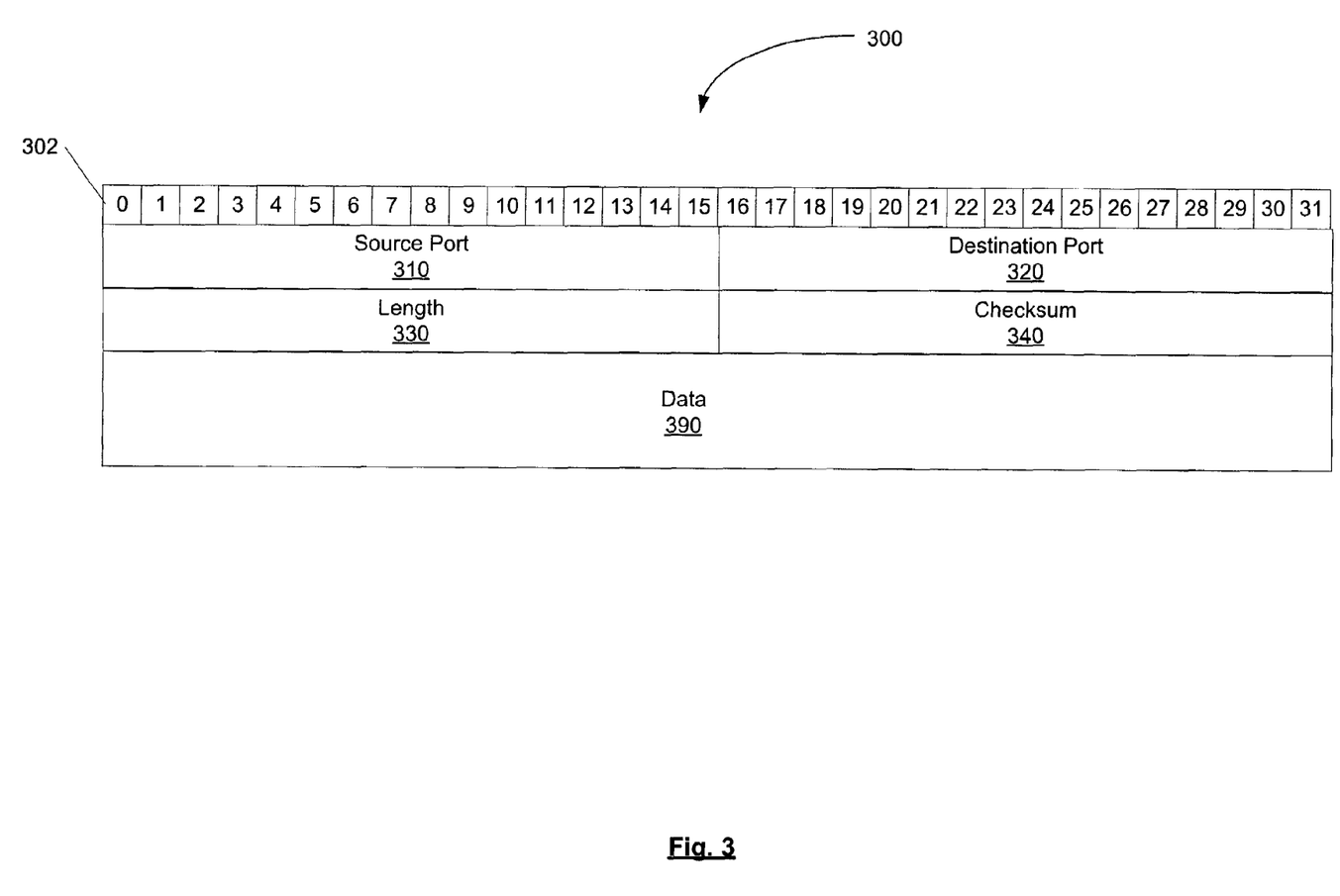
FIG. 3 illustrates one embodiment of a heartbeat packet.

FIG. 3 illustrates one example of a UDP packet 300 which may be used for the transmission of heartbeats. Row 302 is included merely to indicate bit positions within the packet. As seen in FIG. 3, packet 300 includes a source port 310, destination port 320, length 330, checksum 340 and data 390. Source port 310, destination port 320, length 330, and checksum 340 are generally referred to as a header. Data 390 is generally referred to as a datagrams. As mentioned above, in the context of a heartbeat mechanism, the mere fact that a packet has been received from a particular source may serve as an indication that the source is alive and functioning. Consequently, if a packet were received via a point-to-point link, very little information within the packet itself would be required. Because the link is point-to-point, the source is already known. Similarly, the receipt of the packet is evidence the source is alive. Given such a mechanism, much of the information which is provided by the packet 300 illustrated in FIG. 3 may be unnecessary. In the event a multi-cast or broadcast link is utilized for a heartbeat network, little more than the source port 310 and destination port 320 may be required. Numerous configurations are possible and are contemplated.

While heartbeat mechanisms may typically have minimal requirements, various protocols may specify minimum packet sizes which exceed what is strictly necessary for implementation of the heartbeat mechanism itself. One example of a protocol which may require a minimum packet size is the Ethernet protocol. In a typical implementation, an Ethernet configuration may require a minimum packet size of 64 bytes. This minimum size is related to the nature of the protocol itself. If the packet size were too small, a workstation may begin transmitting a new packet before a collision has been detected. Consequently, the minimum packet size is chosen such that the transmission of a packet takes a sufficiently length of time to enable a sender to detect a collision a know a resend of the packet is required. Other protocols may set minimum packet sizes for other reasons.

Because a particular protocol may require a minimum packet size, the packet 300 illustrated in FIG. 3 may be padded with garbage, or null, data in the data field 390 to fill out the size of the packet. Thus, a significant portion of the bandwidth consumed by the heartbeats (and their largely null payloads) may be required by the protocol itself and not the particular requirements of the heartbeat mechanism. Taking advantage of these null payloads, a mechanism for communicating between nodes is provided. Rather than sharing bandwidth resources according to the options described above, inter-node messages may be transported between nodes as the payload of heartbeats.

In one embodiment, inter-node messages are conveyed within heartbeat packets without altering the size of heartbeat packets. Therefore, heartbeat packets may retain a fixed uniform size. However, instead of the heartbeat packet payload being padded with null data, inter-node message data is stored as the heartbeat packet payload. In the event an inter-node message exceeds the size which can be accommodated by a heartbeat packet, the message is partitioned into blocks which are sufficiently small to fit within a heartbeat packet.

Figure 4:
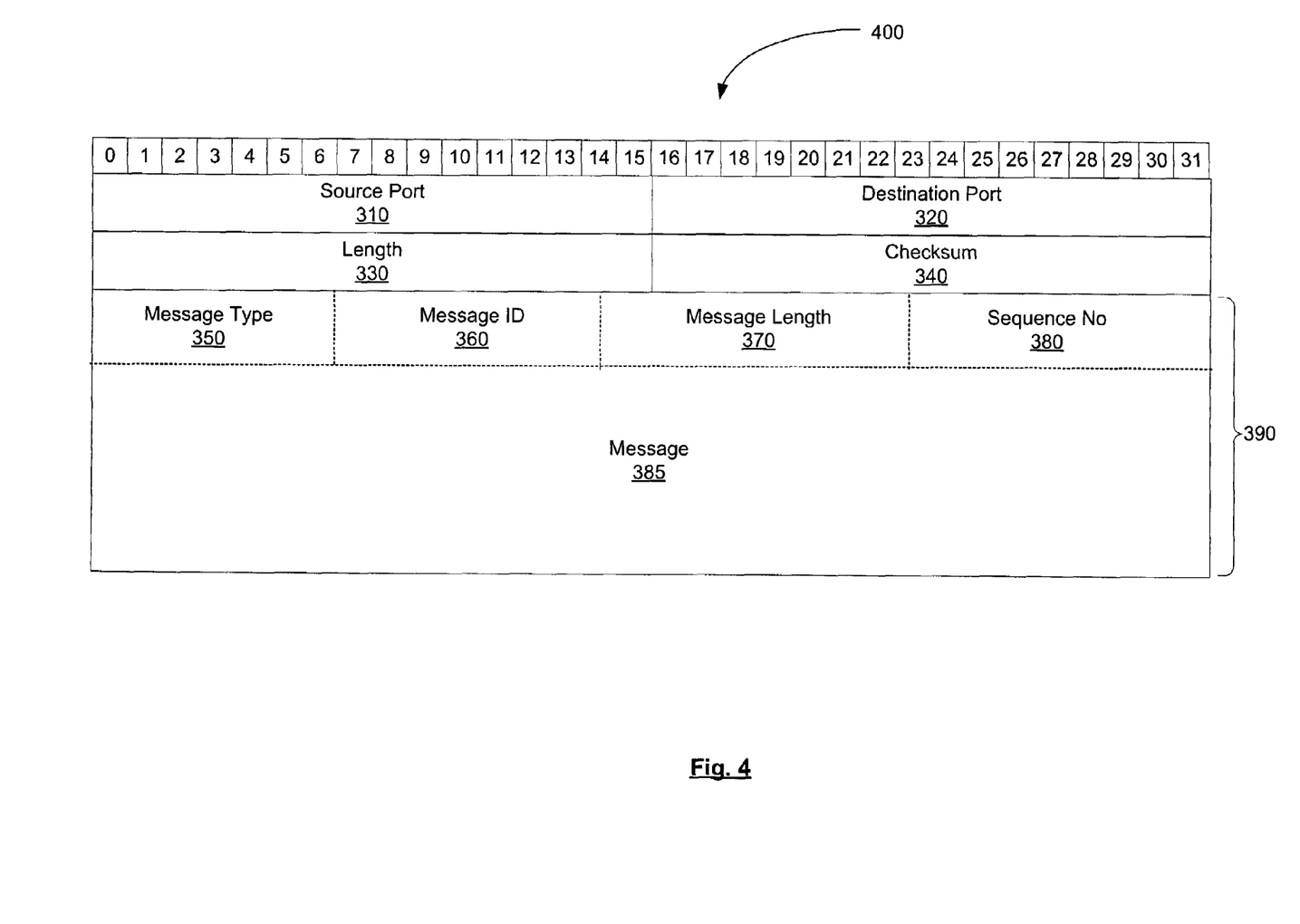
FIG. 4 illustrates one embodiment of a heartbeat packet.

FIG. 4 illustrates one embodiment of a heartbeat packet 400 which has been modified to support inter-node messaging. While numerous packet configurations are possible, the UDP type packet as illustrated in FIG. 3 utilized for purposes of discussion. Packet 400 includes both header (310, 320, 330, 340) and data 390 sections as before. However, data section 390 has been modified to include additional identifiable information. In the embodiment shown, data section 390 includes subsections indicating a message type 350, message identifier 360, message length 370, sequence number 380, and inter-node message 385. Message type 350 may be used to indicate an inter-node message is present and/or the particular type of inter-node message. Message ID 360 may be used to uniquely identify, and distinguish, messages from one another. Message length 370 may be used to indicate the length of the inter-node message included in the message section 385. Sequence number 380 may be used to identify a particular block of an inter-node message which has been partitioned. Subsections 350, 360, 370, and 380 may be considered a pseudo-header for the inter-node message. Finally, the message section 385 is configured to store an inter-node message, or a portion of an inter-node message which has been partitioned.

Figure 5:
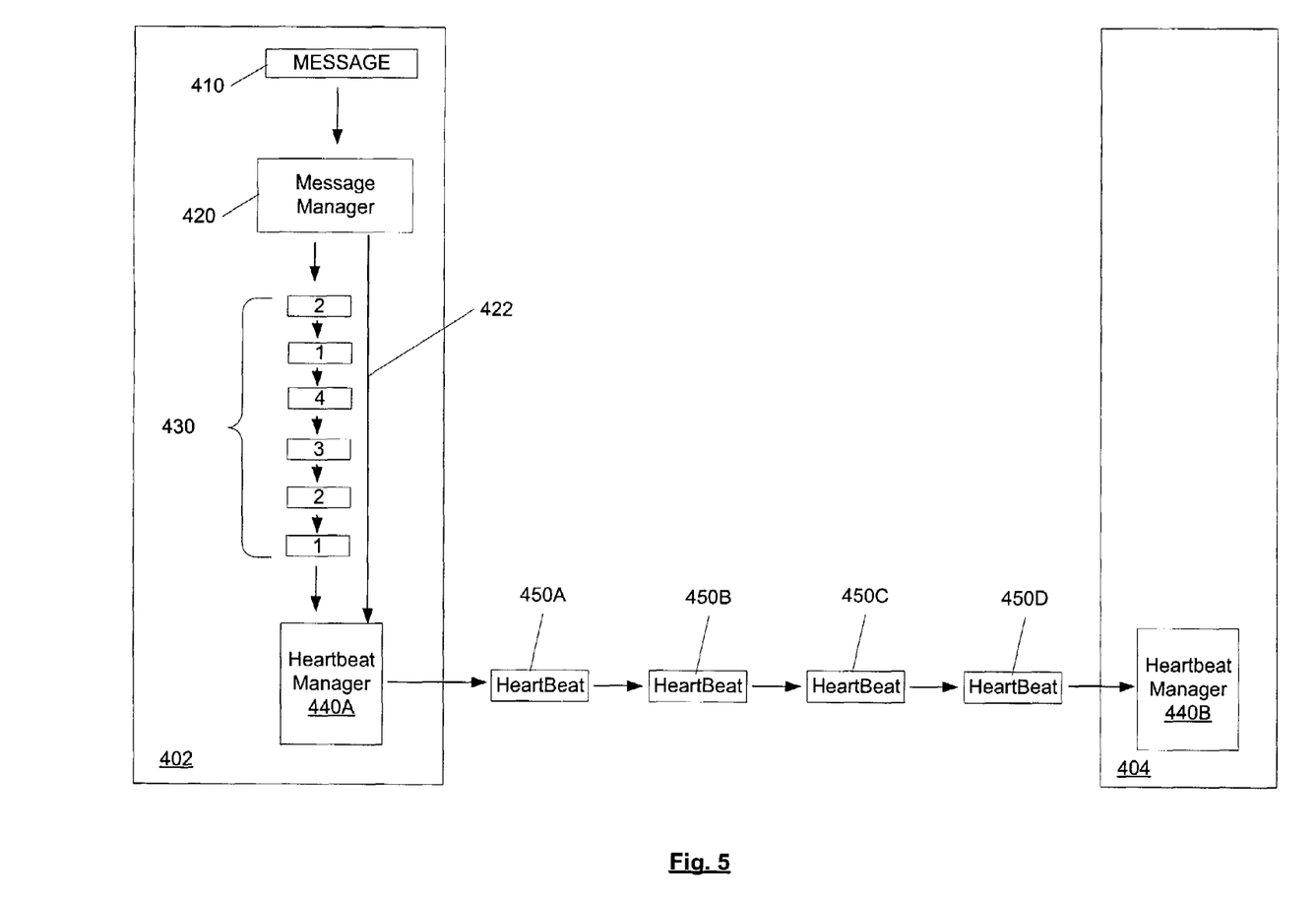
FIG. 5 illustrates two nodes of a computer network.

Based upon the modified heartbeat packet 400 illustrated in FIG. 4, or similar packet, FIG. 5 provides an overview of a system configured to support inter-node communication via a heartbeat mechanism. FIG. 5 depicts a cluster including two nodes 402A-402B. Each node 402 includes a heartbeat manager 440A-440B which is configured to send and/or receive a heartbeat. In the example shown, node 402A is shown periodically conveying heartbeats 450A-450D to node 402B. Node 402A is also shown to include a message manager 420 which is configured to detect and prepare messages for conveyance via the heartbeat manager 440A. Heartbeat manager 440A and message manager 420 may comprise software and/or hardware components. It is noted that message manager 420 need not be a separate component, but may be incorporated directly into the heartbeat manager 440A itself. It is further noted that while a cluster is used for purposes of illustration, the methods and mechanisms described herein may be applied to other network configurations as well, including large scale Internet based networks and computing grids.

Generally speaking, message manager 420 partitions messages into blocks whose size can be accommodated by a heartbeat packet. Each block of the message is then conveyed to the heartbeat manager 440A. In addition to conveying the partitioned blocks 430 to the heartbeat manager, the message manager 420 may be configured to convey one or more of the identifiers illustrated in FIG. 4, such as a message type 350, message ID 360, message length 370, and sequence number 380. In addition, message manager 420 may be configured to convey a signal 422 to the heartbeat manager 440A indicating an inter-node message is available for transmission. Heartbeat manager 440A may then store received blocks and other identifying information (350, 360, 370, 380) in heartbeat packets 450 which are then conveyed to node 402B.

As an example, message manager 420 may receive an indication from some event manager or other process within the node 402A that an inter-node message 410 is available for transmission. In response to detecting a new message, the message manager 420 may be configured to generate a unique message ID for use in identifying the particular message. In addition, message manager 420 may determine the size of the message 410. If the message 410 is larger than can be accommodated by the payload of a heartbeat message, the message 410 is partitioned into smaller blocks—each of which may be accommodated by a heartbeat packet. In the event a message block does not completely fill a heartbeat packet to a minimum required packet size, the heartbeat packet may be padded.

In addition to message data, each block may have a pseudo-header appended. This pseudo-header may include the unique message ID which identifies the message to which the block belongs, the type of message being communicated, and the length or size of the block. In addition, each of the partitioned blocks may have an associated sequence number which distinguishes one block from another. For example, if a message is partitioned into 100 blocks, each of the blocks may be assigned a sequence number from 0-99. In addition, the total number of blocks in the message may be appended as well. In this manner, the receiving node 402B may be able to ascertain when all blocks of a particular message have been received. If the receiving node detects a new message is being transmitted prior to receiving all blocks for a current message, the receiving node may simply discard all packets of the incompletely received message and begin receive processing of the new message. New messages may be detected by the message ID, a single flag or bit in a message header, or some other suitable mechanism.

In one embodiment, message manager 420 and/or heartbeat manager 440A may be configured to convey message blocks in a cyclic manner. In other words, message blocks may be repeatedly conveyed to a receiving node 402B until a new message transmission is initiated or until message transmission is terminated. As message blocks may be identified by a sequence number, it is not necessary that the blocks be transmitted in any particular sequence. If the receiving node 402B detects the message ID and sequence number for a received block correspond to a block already received, the received block may simply be discarded or otherwise processed as required for heartbeat packets. Once all blocks for a particular message have been received by a receiving node, the received blocks may be reconstructed and/or processed accordingly.

Given that the particular protocol utilized for transmission of heartbeat or similar messages (e.g., UDP) may be relatively simple, few mechanisms may be in place for dealing with connection problems. Particularly in a protocol where there is no guaranteed delivery, and no acknowledgements, reliable inter-node communication via the heartbeat mechanism described above may be problematic. Therefore, in order to enhance the reliability of the above described inter-node communication mechanism, suitable methods of forward error correction may be used.

Generally speaking, forward error correction may include the transmission of redundant packets which enable a receiving device to reconstruct individual packets which have been lost. In one embodiment, a class of forward error correcting codes known as erasure codes may be utilized to improve the reliability and efficiency of a heartbeat based, inter-node communication mechanism. Some well known erasure codes include Reed-Solomon codes and Tornado codes. Erasure codes involve the encoding of k packets of a source message into n encoded packets, where n>k. The encoding is such that any subset of k packets of the n encoded blocks may be used to reconstruct the original message. Consequently, a receiving device can recover from the loss of up to (n−k) packets for a given message of n encoded packets.

Figure 6:
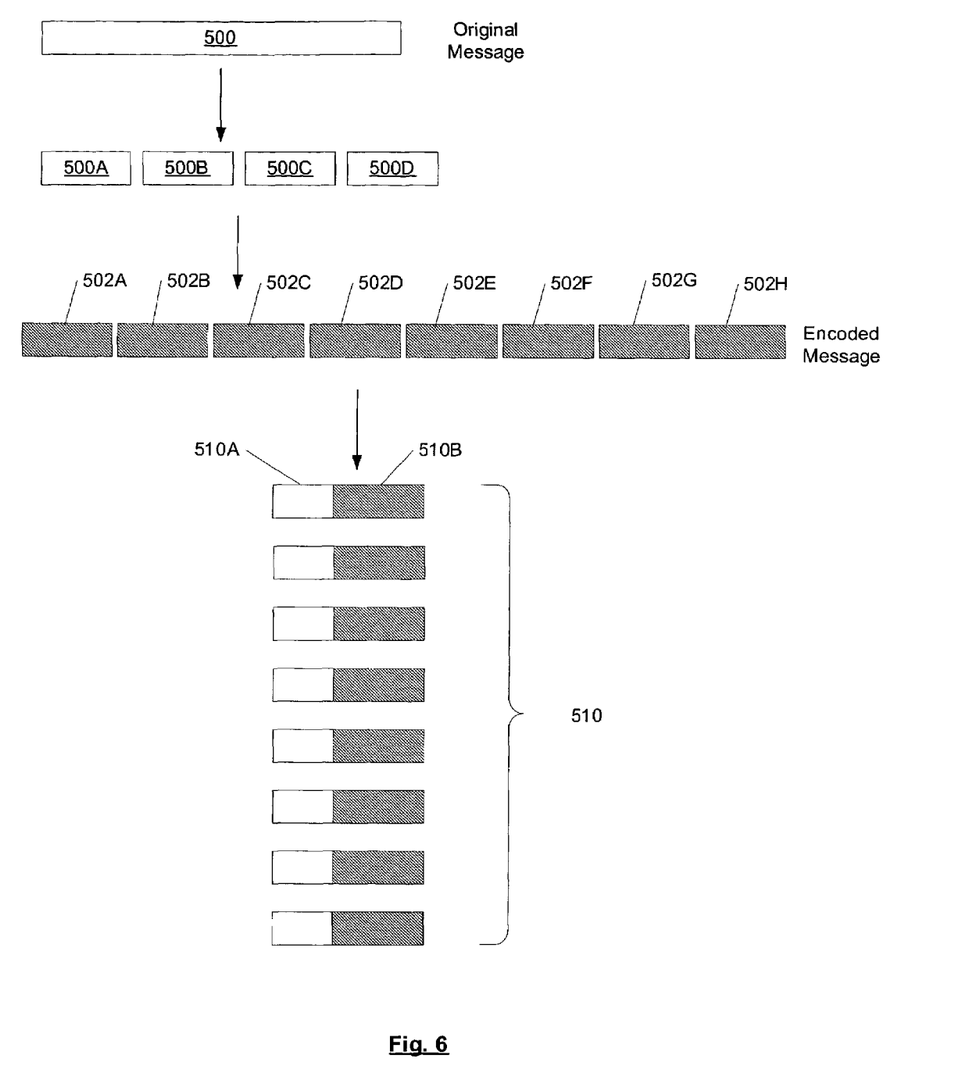
FIG. 6 is a diagram illustrating the encoding and transmission of a message.

FIG. 6 illustrates the encoding and conveyance of a message utilizing an erasure code. An original message 500 is detected as being available for inter-node communication. Because the message 500 is too large to be accommodated by a heartbeat packet, the message 500 partitioned into blocks 500A-500D. These source blocks 500A-500D are then encoded into blocks 502A-502H according to a selected erasure coding algorithm. These encoded message blocks 502 are then stored as payload 510B in heartbeat packets 510 for transmission. Each of the heartbeat messages may also include header and/or pseudo-header information 510A as described above. In this embodiment, pseudo-header information may include the number of messages blocks 500A-500D in the original message 500, as well as a distinct sequence number for each of the encoded blocks 502. When a receiving device detects that it has received a number of distinct encoded blocks 502 equal to the number of blocks 500A-500D in the original message, the receiving device may reconstruct the original message 500. As previously described, the blocks 502 of the encoded message may be transmitted in a cyclic manner until a new message is detected or until message transmission is terminated.

Figure 7:
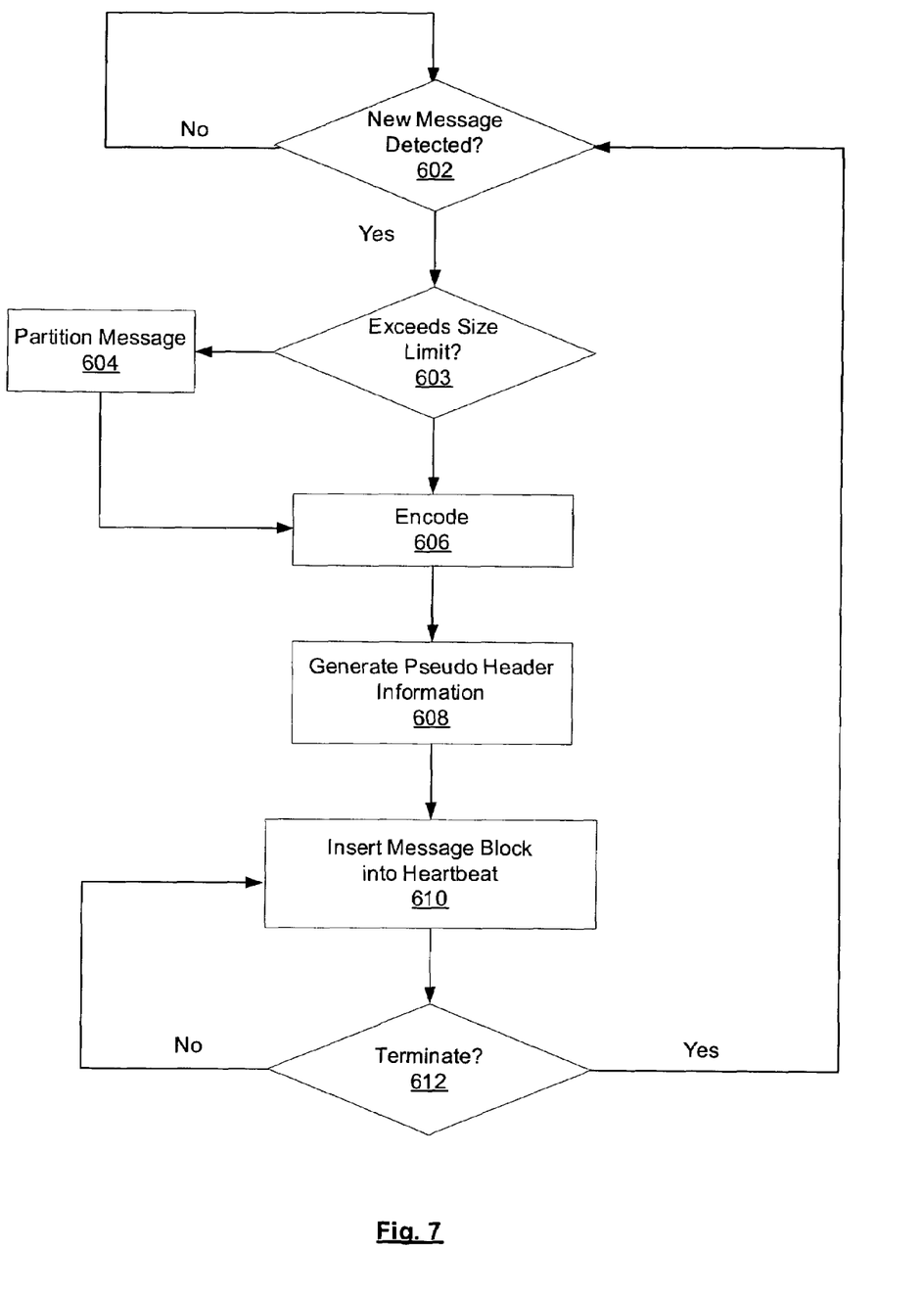
FIG. 7 illustrates one embodiment of a method for conveying messages.

Turning now to FIG. 7, a flow chart illustrating one embodiment of a method for inter-node communication is provided. Decision block 602 indicates a state wherein a new message available for inter-node communication may be detected. In the event a new message is detected (decision block 602), a determination is made (decision block 603) as to whether or not the message exceeds the size limit of a heartbeat packet. If the heartbeat packet size limit is exceeded (decision block 603), the message is partitioned (block 604) into blocks which are sufficiently small to be incorporated into a heartbeat packet. The partition blocks are then encoded (block 608) utilizing a coding technique such as the erasure codes described above. Subsequently, pseudo-header information is generated (block 606) which may indicate that this message, or message blocks, correspond to a new message, the message length, the block sequence number, and so on.

In one embodiment, the indication that the message blocks correspond to a new message may comprise generating a unique message ID for the message. Each of the encoded message blocks are then inserted into heartbeat packets (block 610) for conveyance. If a terminate transmission signal, or other indication, is received (decision block 612), processing returns to decision block 602 to await a new message. If not terminate signal is received (decision block 612), then insertion of blocks into heartbeat packets (block 610) continues. It is noted that the flowchart of FIG. 7 is intended to be illustrative only. Numerous alternatives are possible and are contemplated. For example, portions of the generation of pseudo-header information (block 608) may occur concurrent with the message partitioning (block 604), encoding (block 606), or otherwise.

As already mentioned, one or more components of the above described method and mechanism may comprise hardware and/or software. In those embodiments in which components comprise software, the program instructions which form the components may be conveyed or stored on a computer accessible medium. Numerous types of media which are configured to store program instructions are available and include hard disks, floppy disks, CD-ROM, DVD, flash memory, Programmable ROMs (PROM), random access memory (RAM), and various other forms of volatile or non-volatile storage.

Numerous variations and modifications will become apparent to those skilled in the art once the above disclosure is fully appreciated. It is intended that the following claims be interpreted to embrace all such variations and modifications.

What is claimed is:

1. A computing system comprising:
    a first node coupled to a first communication link; and
    a second node coupled to the first node via said link;
    wherein the first node is configured to:
        convey a plurality of data packets of a first type to the second node via the link, each of said packets being conveyed according to a predetermined schedule;
        detect an inter-node communication message is available for transmission; and
        insert said message within one of said data packets;
    wherein the first node is configured to insert said message within one of said data packets responsive to determining the message does not exceed a predetermined size, and wherein in response to determining the message exceeds said size, the first node is configured to:
        partition the message into a first plurality of blocks each of said blocks being less than or equal to said size;
        encode the first plurality of blocks into a second plurality of blocks, said second plurality being greater than said first plurality; and
        insert each of the encoded blocks within a different one of said packets.

2. The computing system of claim 1, wherein the first node is further configured to generate pseudo-header information corresponding to said message and convey said pseudo-header information to said second node with said packets.

3. The computing system of claim 2, wherein said pseudo-header information is selected from the group consisting of: a unique message identifier corresponding to said message, a message type indication, a message length indication, and a sequence number corresponding to each block.

4. The computing system of claim 1, wherein subsequent to receiving any combination of a number of the encoded blocks equal to the first plurality, the second node is configured to reconstruct the message.

5. The computing system of claim 4, wherein the link comprises a heartbeat network, and wherein the system further comprises a data network interconnect coupled to the first node and the second node.

6. The computing system of claim 1, wherein the first node is configured to encode the first plurality of blocks pursuant to an erasure code algorithm.

7. A method of inter-node communication comprising:
    conveying a plurality of data packets of a first type from a first node to a second node via a communication link, each of said packets being conveyed according to a predetermined schedule;
    detecting in the first node an inter-node communication message is available for transmission; and
    inserting said message within one of said data packets, wherein said inserting is responsive to determining the message does not exceed a predetermined size; and
    wherein in response to determining the message exceeds said size:
        partitioning the message into a first plurality of blocks, each of said blocks being less than or equal to said size;
        encoding the first plurality of blocks into a second plurality of blocks, said second plurality being greater than said first plurality; and
        inserting each of the encoded blocks within a different one of said packets.

8. The method of claim 7, further comprising generating pseudo-header information corresponding to said message and conveying the pseudo-header information to said second node within said packets.

9. The method of claim 8, wherein said pseudo-header information is selected from the group consisting of: a unique message identifier corresponding to said message, a message type indication, a message length indication, and a sequence number corresponding to each block.

10. The method of claim 7, further comprising reconstructing the message subsequent to receiving any combination of a number of the encoded blocks, said number being at least equal to the first plurality.

11. The method of claim 10, wherein the link comprises a heartbeat network, and wherein the system further comprises a data network interconnect coupled to the first node and the second node.

12. The method of claim 7, wherein said encoding is pursuant to an erasure code algorithm.

13. A node configured for inter-node communication, said node comprising:
    a first component configured to convey a plurality of data packets of a first type via a communication link, each of said packets being conveyed according to a predetermined schedule; and
    a second component configured to:
        detect an inter-node communication message is available for transmission; and
        responsive to determining the message does not exceed a predetermined size, convey said message to said first component for insertion in one of said data packets;
        responsive to determining the message exceeds said size:
            partition the message into a first plurality of blocks, each of said blocks being less than or equal to said size;
            encode the first plurality of blocks into a second plurality of blocks, said second plurality being greater than said first plurality; and
            convey each of said encoded blocks to said first component for insertion within a different one of said packets.

14. The node of claim 13, wherein the second component is further configured to generate pseudo-header information corresponding to said message, said pseudo-header information being selected from the group consisting of: a unique message identifier corresponding to said message, a message type indication, a message length indication, and a sequence number corresponding to each block.

15. The node of claim 13, wherein the second component is configured to encode the first plurality of blocks pursuant to an erasure code algorithm.

16. A computer readable medium comprising program instruction, said instructions being executable to:
    convey a plurality of data packets of a first type from a first node to a second node via a communication link, each of said packets being conveyed according to a predetermined schedule;
    detect in the first node an inter-node communication message is available for transmission; and
    insert said message within one of said data packets responsive to determining the message does not exceed a predetermined size;
    responsive to determining the message exceeds said size:

partition the message into a first plurality of blocks, each of said blocks being less than or equal to said size;

encode the first plurality of blocks into a second plurality of blocks, said second plurality being greater than said first plurality; and insert each of the encoded blocks within a different one of said packets.

17. The computer readable medium of claim 16, wherein said program instructions are further executable to generate pseudo-header information corresponding to said message and convey the pseudo-header information to said second node within said packets, said pseudo-header information being selected from the group consisting of: a unique message identifier corresponding to said message, a message type indication, a message length indication, and a sequence number corresponding to each block.

18. The computer readable medium of claim 16, wherein the program instructions are further executable to enable the second node to reconstruct the message subsequent to receiving any combination of a number of the encoded blocks, said number being at least equal to the first plurality.

19. The computer readable medium of claim 18, wherein said program instructions are executable to encode said blocks pursuant to an erasure code algorithm.

* * * * *